United States Patent
Koslow

(10) Patent No.: US 9,238,466 B2
(45) Date of Patent: Jan. 19, 2016

(54) CONTROL OF THE DRIVING STYLE OF A MOTOR VEHICLE WITHIN LOCALITIES (CITY DRIVING CYCLE)

(71) Applicant: Alexander Koslow, Landshut (DE)

(72) Inventor: Alexander Koslow, Landshut (DE)

( * ) Notice: Subject to any disclaimer, the term of this patent is extended or adjusted under 35 U.S.C. 154(b) by 199 days.

(21) Appl. No.: 13/774,190

(22) Filed: Feb. 22, 2013

(65) Prior Publication Data

US 2013/0166148 A1 Jun. 27, 2013

Related U.S. Application Data

(63) Continuation of application No. PCT/DE2011/001332, filed on Jun. 22, 2011.

(30) Foreign Application Priority Data

Sep. 3, 2010 (DE) .......................... 10 2010 036 266

(51) Int. Cl.
  *G06F 17/00* (2006.01)
  *B60W 50/08* (2012.01)
  *B60W 50/00* (2006.01)

(52) U.S. Cl.
  CPC .............. *B60W 50/082* (2013.01); *G06F 17/00* (2013.01); *B60W 2050/0077* (2013.01); *B60W 2540/04* (2013.01); *B60W 2550/141* (2013.01); *B60W 2550/402* (2013.01); *Y02T 10/56* (2013.01)

(58) Field of Classification Search
  CPC .................. B60W 50/082; B60W 2050/0077; B60W 2540/04; B60W 2550/402; B60W 2550/141; G06F 17/00; Y02T 10/56
  USPC ........................................................... 701/36
  See application file for complete search history.

(56) References Cited

U.S. PATENT DOCUMENTS

| | | | | |
|---|---|---|---|---|
| 5,600,323 | A * | 2/1997 | Boschini | 341/173 |
| 7,601,092 | B2 * | 10/2009 | Holmes | B60K 6/445 477/115 |
| 2003/0015874 | A1 * | 1/2003 | Abe | B60K 6/48 290/40 C |
| 2004/0168512 | A1 * | 9/2004 | McEwan | 73/146 |
| 2005/0278214 | A1 * | 12/2005 | Takida | 705/13 |
| 2006/0244581 | A1 * | 11/2006 | Breed et al. | 340/447 |
| 2008/0246603 | A1 * | 10/2008 | Mutou | 340/539.13 |
| 2009/0118962 | A1 * | 5/2009 | Heap | B60K 6/365 701/99 |
| 2010/0019570 | A1 * | 1/2010 | Kade | B60R 16/03 307/10.1 |
| 2010/0106401 | A1 * | 4/2010 | Naito et al. | 701/201 |
| 2010/0175936 | A1 * | 7/2010 | Schneider | B60W 10/06 180/65.28 |
| 2011/0039655 | A1 * | 2/2011 | Kaltenbach | B60K 6/48 477/5 |
| 2011/0180337 | A1 * | 7/2011 | Khatchikian | B60K 6/48 180/65.25 |

(Continued)

FOREIGN PATENT DOCUMENTS

| | | | | |
|---|---|---|---|---|
| CN | 101508298 A | * | 8/2009 | B60K 6/365 |
| DE | 10138119 A1 | | 2/2003 | |

(Continued)

OTHER PUBLICATIONS

International Search Report Application No. PCT/DE2011/001332 Completed: Jan. 25, 2012; Mailing Date: Feb. 3, 2012 2 pages.

*Primary Examiner* — Tuan C. To

(74) *Attorney, Agent, or Firm* — Whitmyer IP Group LLC

(57) ABSTRACT

A control system for vehicles to operate at an ecological driving modus, for example in case they are used within a locality such as a city or town. A control system initiated by a clearly identifiable switch installed either at the dashboard or on the steering wheel, the switch being manually operated by the driver. The control system can be can also be initiated via radio- or light-waves' signals.

10 Claims, 1 Drawing Sheet

(56) References Cited

U.S. PATENT DOCUMENTS

2012/0007712 A1* 1/2012 Tung .......................... 340/5.72
2012/0109496 A1* 5/2012 Hylands ............. F02D 19/0631
　　　　　　　　　　　　　　　　　　　　701/103

FOREIGN PATENT DOCUMENTS

| DE | 10253809 A1 | 5/2004 |
| DE | 102007053279 A1 | 5/2009 |
| WO | 0263163 A1 | 8/2002 |

* cited by examiner

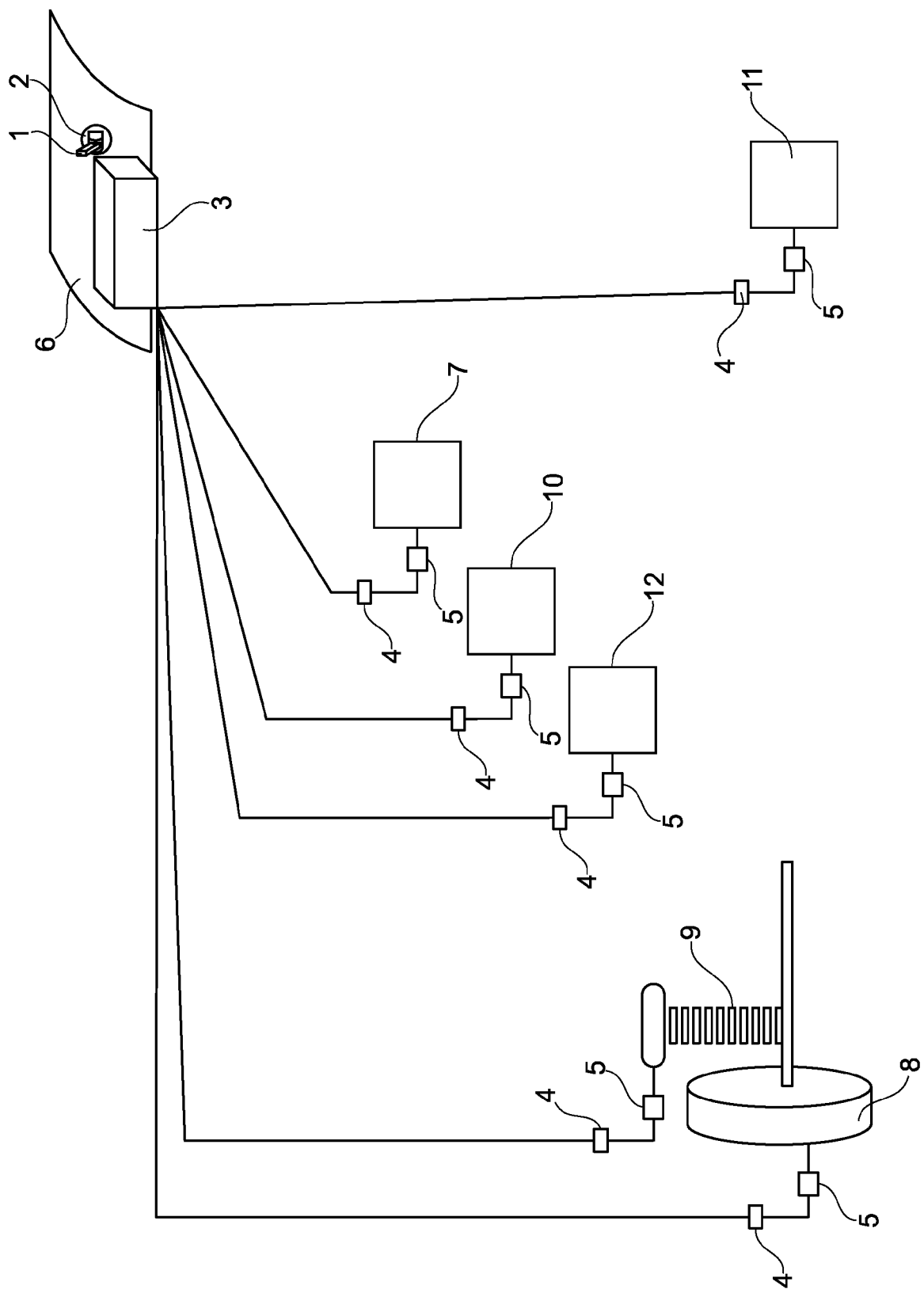

CONTROL OF THE DRIVING STYLE OF A MOTOR VEHICLE WITHIN LOCALITIES (CITY DRIVING CYCLE)

FIELD OF THE INVENTION

A control system for vehicles to operate at an ecological driving modus that leads to a minimum of energy consumption and hence to a minimum of environmental damage.

BACKGROUND AND SUMMARY OF THE INVENTION

Nowadays control systems for vehicles are known, which consider ecological and economical standards without requiring separate actions from the driver of a vehicle. Such control systems mostly are initiated by the driver of a vehicle and then follow-up automatically. The control systems include accounting for various driving situations. One such control system, of the invention is recommended for driving situations, which are not yet taken into consideration. Nonetheless these driving situations are equally as important as other driving situations that are already considered.

An example of a driving situation that is typically not considered, and thus, less controlled by control systems, occurs within the boundary of a city. Traffic lights, less easy to survey passages for pedestrians, and delivery traffic and hindrances created by road work or building sites create a permanent stop and go situation that is a driving situation that is problematic.

For current vehicles, driving without the boundaries of a city is a problem as consumption of energy combined with emission of pollution-gases into the environment within the boundary of a city is a problem.

Nowadays support systems for vehicles are known, which inform whether the way of driving meets ecological standards, and shows, how high the consumption of gas is per kilometer of driving distance. In this way the driver of the vehicle is informed how to organize his way of driving in order to meet ecological and at the same time economical standards. This is called economical information. Equally a driver of an off-road vehicle is instructed how to drive such a vehicle off-road or on roads in an ecological and economical way in cities.

While such control systems are known, what does not yet exist is a simple operation device for driving a car inside the boundaries of cities that consider all unexpected events when running a car. Current systems involve that each individual driver of a car must rely on himself and only his experience to assist him to drive his car in a meaningful ecological and economical way in cities. It is thus desirable to improve upon the driving style of a motor vehicle within a city.

In order to meet such objectives the present invention recommends to place operation means at the dashboard or on the steering wheel of a vehicle, which support the driver of a car in cities in order to improve upon the driving style of a motor vehicle within a city. Such operation means may be manually manipulated switches or automatic control systems that are initiated by signals issued when entering into a town by radio- or light-waves signals issuing means.

All these aids are based on the combustion of carbon-hydride contained in primary-energy fuels as gasoline or diesel fuel or for electrical drives, whenever the electrical energy is produced by means that create environmental damaging components. In this context energy consumption should be the guideline, too. Particularly for electro-drive assemblies energy consumption should be the main guidance. Hereby functionality of a vehicle and hence, its driving distance are limited prior to the necessity to recharge its batteries. The functionality of a vehicle without demanding for a recharging of its batteries is essential for a general introduction into the markets of such a driving system. The presently known energy storage systems are accumulators, batteries and so on. They have only a limited storage capacity. This is the reason why only optimized energy consumption may reduce such a defect and hence, enable an acceptable driving distance.

It is already known to equip vehicles with switch-systems to have a vehicle run at a certain so desired speed and by that means to control fuel delivery to the engine in order to maintain a speed so desired. That may be the case when driving inside or outside a town. It is essential to maintain a certain speed by engine control systems and/or by controlling the gear. Engine controlling is geared by controlling fuel flow to the engine. It is also essential for such control systems that the goal of energy consumption is not due to ecology but to maintain a certain speed of a vehicle. May that be due to a speed limitation when driving on a road with a high rate of accidents or when driving inside a town for avoiding noise and similar inconveniences. Driving inside a town plays in such cases only a subordinated role. Other components for a vehicle control, besides controlling of the engine or gear, are not taken into consideration.

For hybrid driving systems it is also known to survey the charge situation of the batteries in order to prevent a surcharging or avoid a complete discharge of the batteries. Therefore, either energy is further supplied to batteries or it is stopped.

Control systems are also known to create an efficient driving modus following a pre-defined cycles, adapted to an individual characteristic of a certain combustion engine, which optimizes by an electronic control system individual set of groups that are important for the running of the engine (e, g. cooling of individual aggregates).

From this known state of the art this invention differs essentially. Not simple control systems for speed or generally usable driving modus are the goal of the present invention, but all kind of control and manipulating systems for the complete set of aggregates mounted on and to a vehicle that have an impact to an ecological driving inside of towns, particularly having an eye to the in town traffic situation. Moreover, the present invention is directed to, not only manipulating the operational requirements of an internal combustion engine, but also considering energy consumption of all type of vehicles including electrically driven and hybrid vehicles.

This is the point at which this invention starts. One object of the present invention is at least to reduce such defects related to the actuating systems of vehicles. Combined with such intentions is an improvement of economic and ecological conditions when operating such vehicles.

The invention recommends to provide the driver of a vehicle with possibilities, when driving in towns or at any similar traffic situations, to manipulate by simple means a control system that automatically initiates the operation of aggregates, imminently part of a vehicle, to a driving modus that leads to a minimum of energy consumption and hence to a minimum of environmental damage. This means that for example the engine runs at a minimum of gasoline consumption, that also its revolution, cooling or gear position are controlled at a minimum gasoline consumption with regard to the actual traffic situation. In addition, suspension and air pressure in tires are controlled in such a way that rolling-resistance of tires on the road is minimized and high-beam headlamps are switched to low-beam headlamps. All these measures serve only one purpose, i.e. namely controlling a vehicle that the goal of minimizing energy consumption, particularly when driving in towns. It is evident that number of aggregates, which can be controlled in such a way depend from the kit of a car and therefore may differ from one car to the other. For example if a vehicle is equipped with an automatic transmission, the revolution of the engine and that of the gear can be adapted that way that the goal of minimizing energy consumption can be approached. Having a manually shifted transmission a hint on the dash board may help to choose the correct gear-wheel combination for minimizing energy consumption.

When running a car in a town in towns, particular driving situations exist, that demand for a well-balanced driving modus, should one demand for minimized energy consumption and should one attempt to meet ecological requirements. Such a necessity is not always required outside of towns. When stopping a car in front of a traffic light, in town or outside of a town at a construction site or when a railway crossing has to be passed or other similar situations, a stopping of the engine-run may be recommendable from an ecological and economical point of view. Similar situations may occur when speed limitations, accelerations and traffic jams are present. Even controlling of the ignition point, stopping of the movement of some pistons contributes to the goal of this invention, since an accelerated or delayed ignition (early or delayed ignition relative to the stroke of a piston, respectively prior to reaching the top dead center of a piston within the operation-cycle of an internal combustion engine) influences significantly consumption of fuel. The rolling resistance of a tire is as well known a parameter of the air-pressure inside the tire. All these parameters may be centrally activated by a switch located on the dash-board or the steering wheel only dependent on how a car is equipped. By those means special experience or concentration by the driver is not anymore demanded. Therefore such a switch-element may be represented by a manually operable switch that activates a control device, which influences all control devices that operate individual maneuverable elements. Besides such a control device, it is possible to place at the entry to a town a device that emits radio or light signals, so that a receiver for such signals automatically initiates such control operations, whenever a car being so equipped. The control device emits an impulse to a control unit in a car that activates maneuverable elements placed on each individual operation unit so initiating operations and optimizing working of each individual operation unit, e. g. point of ignition, air pressure in tires, choosing kind of light, revolution of engine, gearbox position, and so on, in order to reach an optimal functional relationship for minimizing energy consumption.

When leaving a town the inventive control system may react in a similar way in the opposite direction and return to a normal operation modus. For this purpose, when leaving the town area the control system for driving in town may, similar to the operation of speed limiting devices, deactivate all operation units from in town working operation and making them return to normal way of driving.

In order to facilitate switching to in town way of driving that switch should be clearly marked, for example by a "C" for city.

Objects of the invention are achieved by providing a control system for a vehicle allowing the vehicle to run at a minimum energy input, the control system comprising: a manually or automatically operated switching unit, the switching unit being activated by an impulses emitting organ; and an operation unit attached to an internal combustion engine, an electric motor, a gearbox a tire, or a lighting system, wherein the impulses emitting organ activates the operation unit, and wherein the operation unit manipulates the internal combustion engine, the electric motor, the gearbox the tire, or the lighting system to work at the minimum energy input.

In certain embodiments, control parameters are allocated to gear-wheels relationship, lighting and idling speed control.

In certain embodiments, control parameters for the control system include air pressure in tires, ignition point, stop of engine run when there is a stop sign, additional cooling of internal combustion engine and/or super charging air.

In certain embodiments, the switch on the dashboard or steering wheel is clearly and unmistakably marked by a big letter "C".

In certain embodiments, the control system is activated by a radio-wave signal.

Other objects of the invention are achieved by providing a control system for a vehicle to be manually and automatically used for driving in town in an ecological manner that acts on internal combustion engines and its gearboxes, the control system comprising: a manually or automatically operated switching unit, the switching unit being activated by an impulses emitting organ; and an operation unit attached to an internal combustion engine, an electric motor, a gearbox a tire, or a lighting system, and related operation units controlled by parameters that influence the environment, so that the vehicle to run at a minimum energy input, wherein the impulses emitting organ activates the operation unit, and wherein the operation unit manipulates the internal combustion engine, the electric motor, the gearbox the tire, or the lighting system to work at the peak of the minimum energy input.

In certain embodiments, the switch is attached to the dash board or steering wheel and is clearly and unambiguously marked.

In certain embodiments, the control system may be activated by a signal originated from a radio-wave or light-wave emitter.

In certain embodiments, the related operation units include air pressure in tires, lighting systems, cooling of surcharge air for the engine, air-conditioning systems, and ignition point.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1 is a schematic of a control system in connections with parts of a vehicle in accordance with an embodiment of the invention.

DETAILED DESCRIPTION OF THE INVENTION

Referring to FIG. 1, FIG. 1 is a schematic of a control system in connections with parts of a vehicle in accordance with an embodiment of the invention. FIG. 1 shows a switching unit 1, a switch 2, a control unit 3, a control element 4, an operation unit 5, a dashboard 6, a gearbox 7, a tire 8, a suspension 9, a traction device (engine or electric motor) 10), a lighting system 11 and ignitions 12.

FIG. 1 shows switching unit 1 having a switch 2 that are attached to a control system 3. The control system 3 is shown mounted on a dashboard. The control system controls control element 4 which control lighting 11 and operation unit 5.

The control unit 3 controls the control element 4, which controls gearbox 7 and operation unit 5. The control unit 3 controls a traction device 10 and ignitions 12 through the operation unit 5.

The control unit 3 controls the control element 4, which controls the suspension 9 and tire 8.

While the invention has been specifically described in connection with certain specific embodiments thereof, it is to be understood that this is by way of illustration and not of limitation, and that various changes and modifications in form and details may be made thereto, and the scope of the appended claims should be construed as broadly as the prior art will permit.

The description of the invention is merely exemplary in nature, and, thus, variations that do not depart from the gist of the invention are intended to be within the scope of the invention. Such variations are not to be regarded as a departure from the spirit and scope of the invention.

What is claimed is:

1. A control system for a vehicle allowing the vehicle to run at a minimum energy input, the control system comprising:
    a switching unit;
    a control unit connected to control elements and located inside the vehicle; and
    an operation unit attached to an internal combustion engine, an electric motor, a gearbox a tire, or a lighting system and connected to one of the control elements;
    wherein the control unit is configured to be activated by the switching unit or a signal originated from a radio-wave or light-wave emitter;
    wherein the control elements are configured to activate the operation unit, and
    wherein the operation unit is configured to manipulate the internal combustion engine, the electric motor, the gearbox, the tire, or the lighting system to work at the minimum energy input.

2. The control system of claim 1, wherein control parameters are allocated to gear-wheels relationship, lighting and idling speed control.

3. The control system of claim 1, wherein control parameters for the control system include air pressure in tires, ignition point, stop of engine run when there is a stop sign, additional cooling of internal combustion engine and/or super charging air.

4. The control system of claim 1, wherein the switching unit is located inside the vehicle.

5. The control system of claim 1, wherein the radio-wave or light-wave emitter is located outside the vehicle.

6. The control system of claim 5, wherein the radio-wave or light-wave emitter automatically switches on the control unit as the vehicle passes a specified location.

7. The control system of claim 6, wherein the specified location is a town or a city.

8. A control system for a vehicle to be manually and automatically used for driving in town in an ecological manner that acts on internal combustion engines and its gearboxes, the control system comprising:
    a switching unit;
    a control unit connected to control elements and located inside the vehicle; and
    an operation unit attached to an internal combustion engine, an electric motor, a gearbox a tire, or a lighting system and connected to one of the control elements; and
    related operation units configured to be controlled by parameters that influence the environment, so that the vehicle to run at a minimum energy input;
    wherein the control unit is configured to be activated by the switching unit or a signal originated from a radio-wave or light-wave emitter;
    wherein the control elements are configured to activate the operation unit, and
    wherein the operation unit is configured to manipulate the internal combustion engine, the electric motor, the gearbox, the tire, or the lighting system to work at the peak of the minimum energy input.

9. The control system of claim 8, wherein the switch is attached to the dash board or steering wheel and is clearly and unambiguously marked.

10. The control system of claim 8, wherein the related operation units include air pressure in tires, lighting systems, cooling of surcharge air for the engine, air-conditioning systems, and ignition point.

* * * * *